Patented Oct. 26, 1926.

1,604,839

UNITED STATES PATENT OFFICE.

EDWIN L. AMIDON, OF NORWOOD, OHIO.

HEADLIGHT.

Application filed June 11, 1925. Serial No. 36,450.

This invention relates to an improved motor vehicle headlight and seeks, among other objects, to provide a headlight which will eliminate the usual headlight glare now commonly experienced in connection with ordinary headlights and will thus tend to render night driving more safe and pleasureable.

The invention seeks, as a further object, to provide a headlight which will effectually illuminate the roadway while, at the same time, blinding of an approaching motorist by headlight glare will be avoided And the invention seeks, as a still further object, to provide a headlight wherein the lamp may be readily adjusted for focusing the light beam of the headlight and wherein the lamp may also be adjustably tilted either upwardly or downwardly or from side to side for projecting the light beam in the desired direction as well as at the desired elevation, so that the beams of a pair of headlights may be caused to converge and strike the roadway at the desired distance in front of the vehicle.

Other objects of the invention not above specifically mentioned will appear in the following description.

In the accompanying drawings,

Figure 4 is a detail sectional view on the line 4—4 of Figure 1, looking in the direction indicated by the arrows.

Figure 3:
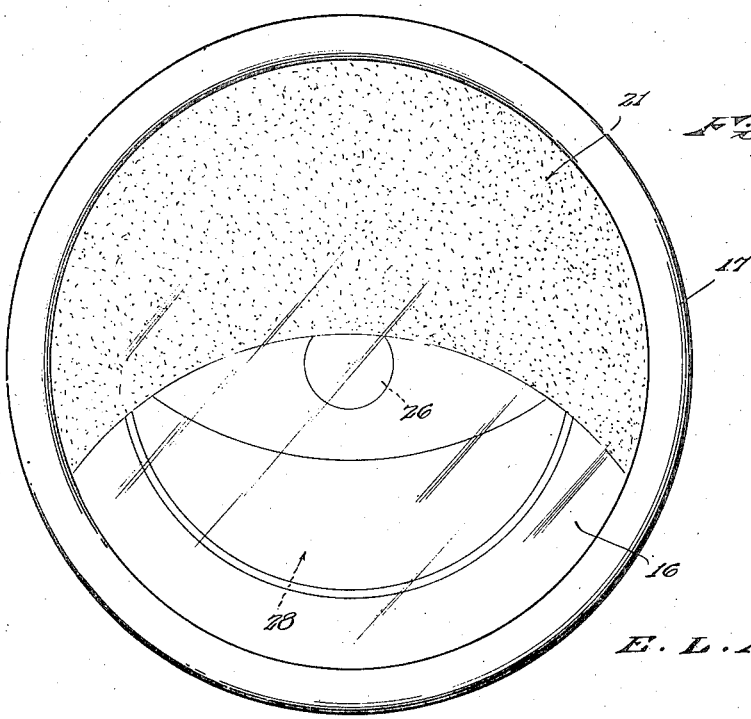
Figure 3 is a front elevation of the headlight, this view particularly showing the relative location of the non-reflecting surface of the reflector and the front lens of the headlight.

In carrying the invention into effect, I employ a cylindrical casing 10 closed at its rear end by a spherically shaped end wall 11, and formed in said wall axially of the casing is an opening 12. Normally closing said opening is a cover plate 13 removably secured to the end wall 11 of the casing by screws or other suitable fastening devices. At its forward end, the casing is provided with an inturned annular flange 14 seating a gasket 15, and resting against said gasket is a front lens 16. Surrounding said lens is a rim 17, one margin of which is bent to form an inturned annular flange 18 which is angle-shaped in cross section to seat the lens while the opposite margin of said rim is bent inwardly and forwardly to provide a flange 19 snugly surrounding the casing. Projecting radially from the casing are pins 20 while the flange 19 of the rim is provided with suitable slots to accommodate said pins so that the rim is thus removably locked upon the casing, and, in this connection, it is to be observed that the flange 18 of the rim serves to yieldably hold the lens 16 in engagement with the gasket 15. Dust and moisture will thus be excluded from the casing. As shown in Figure 3, the lens 16 is formed with an upper crescent-shaped translucent area 21, the lower edge of which curves from a central point slightly above the axis of the casing downwardly to points slightly below the horizontal axial plane of the casing. The lower portion of the lens is clear.

Mounted within the rear portion of the caing 10 is a substantially hemi-spherical reflector 22 which is provided at its rear side with equi-distantly spaced bosses 23 preferably three in number, and projecting rearwardly from the reflector axially thereof is an annular flange 24. Slidably fitting in said flange is an appropriate lamp socket 25, and removably engaged in said socket is a lamp 26 disposed axially of the casing 10 as well as axially of the reflector. Extending freely through the cover plate 13 to the socket 25 are circuit wires 27 for supplying current to the lamp.

Figure 2:
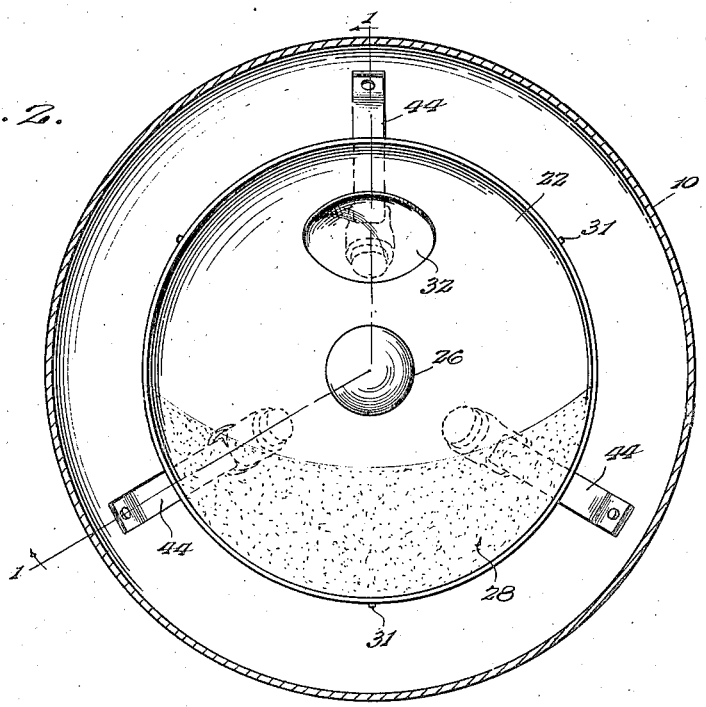
Figure 2 is a sectional view on the line 2—2 of Figure 1, looking in the direction indicated by the arrows, the transparent closure of the reflector being removed.

At its lower portion, the reflector 22 is provided with a crescent-shaped non-reflecting area 28 which may be formed by sandblasting or otherwise suitably dulling the surface of the reflector. As best shown in Figure 2, the upper edge of the area 28 curves from a central point below the axis of the reflector upwardly to points lying close to the horizontal axial plane of the reflector, and closing the reflector is a concavo-convex front glass 29 which is provided auxiliary to the front lens 16 of the casing 10 for preventing the collection of dust or moisture within the reflector. Fitting the reflector at its forward end, is a clamping ring 30 surrounding the periphery of the front glass, and extending from the reflector are studs 31 accommodated by suitable slots in the ring for detachably connecting the ring with the reflector. Thus, the ring will normally serve to tightly hold the front glass 29 in position on the reflector. Mounted within the reflector above the lamp 26 is a downwardly and forwardly tilted auxiliary reflector 32.

Mounted upon the rear end wall 11 of the casing 10, at equi-distantly spaced points, are sockets 33, which are preferably three in number and are provided with flanges 34 to seat flat against said wall at its inner side. Extending through said flanges and through the wall 11 are rivets or other suitable fastening devices 36 securing the sockets in position, and extending from the sockets through said wall are reduced sleeves 37. The sockets 33 are each provided at opposite sides thereof with longitudinal slots and splined in said sockets are sleeves 38 having flanges 38' slidably received in said slots. The sleeves 38 are provided with rounded inner end walls 38" and engaging in the outer ends of said sleeves are adjusting screws 39 journaled through the sleeves 37 of the sockets and provided at their outer ends with heads 40. Formed in the adjusting screws near the outer ends thereof are annular grooves 41 and extending through the sleeves 37 to freely engage in said grooves are locking pins 42 limiting the screws against endwise movement. Thus, the screws 39 may be adjusted for shifting the sleeves 38 endwise within the sockets 33, and mounted to coact with the heads 40 of the adjusting screws, at the peripheries thereof, are locking springs 43 for said screws.

Figure 1:
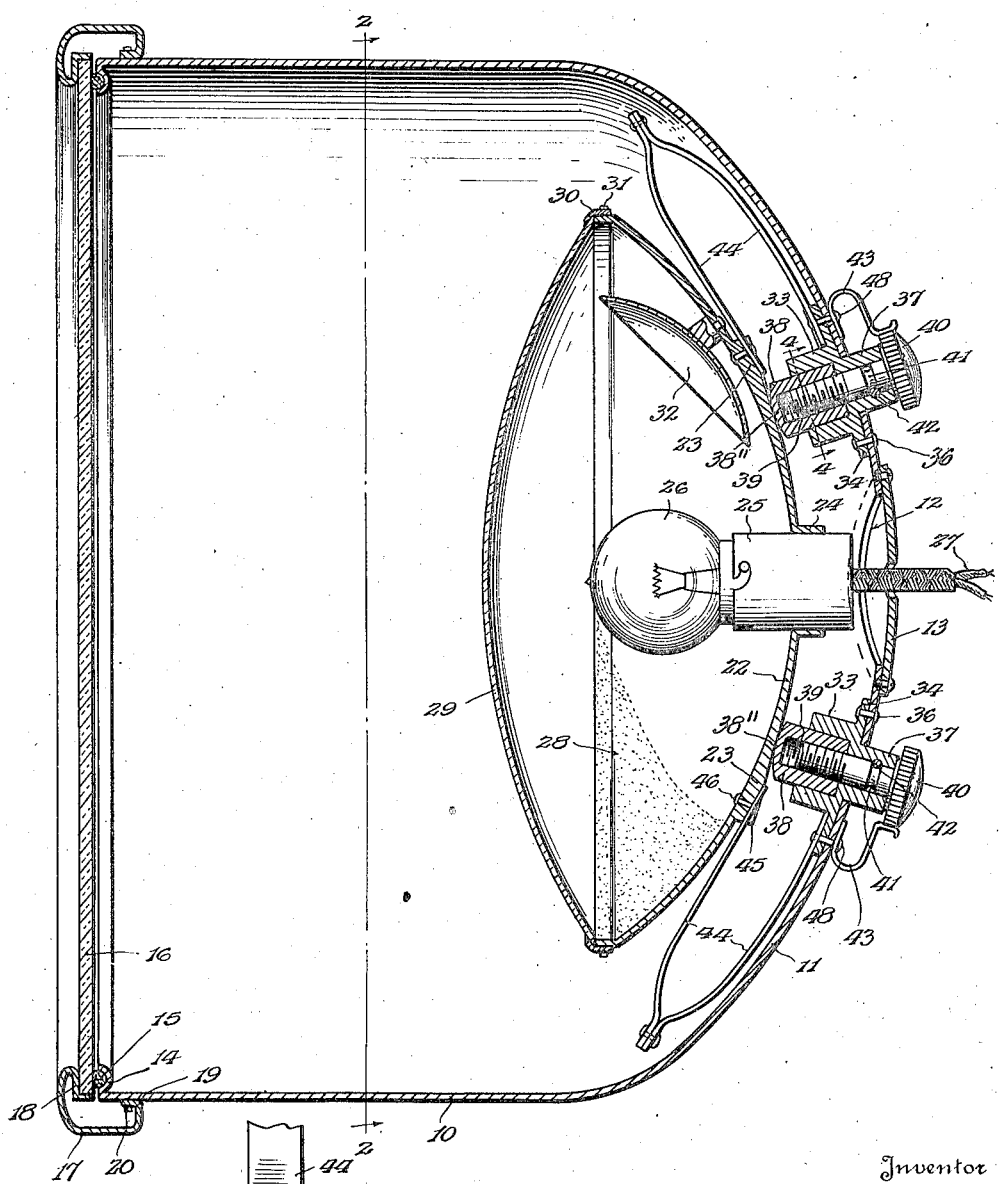
Figure 1 is a sectional view through my improved headlight, on the line 1—1 of Figure 2, looking in the direction indicated by the arrows, and particularly showing the mounting of the reflctor.

Supporting the reflector 22 is a plurality of substantially U-shaped springs 44 which may, as suggested in the drawings, be formed of complemental members riveted or otherwise secured together at their outer ends. Formed in the bosses 23 of the reflector, to snugly accommodate the free ends of the inner spring members are seats 45, and extending through said members and through the bosses are rivets or other suitable fastening devices 46 connecting the springs to the reflector. As shown in Figure 4, the flanges 34 of the sockets 33 are widened at corresponding sides thereof to form seats 47 which snugly accommodate the free ends of the outer spring members, and securing said members are rivets or other suitable fastening devices 48 which extend through the end wall 11 of the casing and also serve to secure the spring 43. As shown in Figure 1, the end walls 38" of the sleeve 38 are disposed to coact with the bosses 23 of the reflector and, as will now be appreciated in view of the foregoing, the springs 44 will yieldably press said bosses against said end walls so that vibration of the reflector will be avoided while, however, the reflector is, as will be seen, mounted for substantially universal movement.

The inside of the casing 10 is coated or painted a neutral color so as to lessen the reflection of the light rays emanating from the lamp 26 and, as will now be seen, the nonreflecting area 28 of the reflector 22 will tend to lessen the upward reflection of the light rays. Furthermore, the translucent area 21 of the lens 16 will filter and subdue the light rays at the upper portion of the lens so that the glare which would otherwise be caused by the upper portion of the beam will be eliminated. At the same time, a beam of light from the lamp will be projected through the clear portion 16 of the lens for efficiently illuminating the roadway. By removing the cover plate 13, the lamp socket 25 may be shifted endwise through the flange 24 of the reflector for focusing the light beam and, as will be seen, the reflector 32 will reflect some of the light downwardly on the roadway short of the focal point of the beam so that the roadway will be well illuminated immediately in front of the vehicle. Furthermore, by adjusting the screws 40, the sleeves 38 may be shifted in the sockets 33, as will be appreciated, for tilting the reflector either upwardly or downwardly or rocking the reflector from side to side so that the reflector may be positioned to project the beam of light in the exact direction desired and at the exact elevation desired. Accordingly, all headlight glare such as is commonly caused by improper projection of the headlight beams as regards direction and elevation, may be entirely eliminated.

Having thus described the invention, what I claim is:

1. A headlight including a casing, a reflector, U-shaped springs yieldably supporting the reflector for universal movement and connecting it to the casing, set screws having swivel connection with the casing, and abutments mounted upon the casing to receive a longitudinal movement and held against rotation and in loose contact with the reflector and in threaded engagement with the said set screws to be moved longitudinally and held in the required adjusted position thereby.

2. A headlight including a casing, a reflector disposed therein, springs yieldably supporting the reflector, sockets carried by the casing, sleeves splined in said sockets and forming abutments for said reflector, and rotatable set screws carried by the sockets and engaging in said sleeves, the set screws being adjustable for shifting the sleeves and tilting the reflector.

In testimony whereof I affix my signature.

EDWIN L. AMIDON.